(12) United States Patent
Doi (10) Patent No.: US 9,676,040 B2
(45) Date of Patent: Jun. 13, 2017

(54) HYDRAULIC CHUCK

(71) Applicant: Daishowa Seiki Kabushiki Kaisha, Higashiosaka-shi, Osaka (JP)

(72) Inventor: Masayuki Doi, Higashiosaka (JP)

(73) Assignee: DAISHOWA SEIKI KABUSHIKI KAISHA, Higashiosaka-shi, Osaka (JP)

( * ) Notice: Subject to any disclaimer, the term of this patent is extended or adjusted under 35 U.S.C. 154(b) by 22 days.

(21) Appl. No.: 14/777,308

(22) PCT Filed: Apr. 10, 2013

(86) PCT No.: PCT/JP2013/060832
§ 371 (c)(1),
(2) Date: Sep. 15, 2015

(87) PCT Pub. No.: WO2014/167669
PCT Pub. Date: Nov. 6, 2014

(65) Prior Publication Data
US 2016/0031015 A1    Feb. 4, 2016

(51) Int. Cl.
*B23B 31/30*    (2006.01)
(52) U.S. Cl.
CPC ........ *B23B 31/305* (2013.01); *B23B 2231/24* (2013.01); *B23B 2250/12* (2013.01); *Y10T 279/1241* (2015.01); *Y10T 279/17111* (2015.01)
(58) Field of Classification Search
CPC .............. B23B 31/305; B23B 2231/24; B23B 2250/12; Y10T 279/1241; Y10T 279/17111
See application file for complete search history.

(56) References Cited

U.S. PATENT DOCUMENTS 5,388,487 A    2/1995  Danielsen
6,666,461 B1   12/2003 Retzbach
(Continued)

FOREIGN PATENT DOCUMENTS

CH    701915 A2    3/2011
CN    1382076 A    11/2002
(Continued)

OTHER PUBLICATIONS

International Search Report of PCT/JP2013/060832.
(Continued)

*Primary Examiner* — Eric A Gates
(74) *Attorney, Agent, or Firm* — Muncy, Geissler, Olds & Lowe, P.C.

(57) ABSTRACT

For enabling accurate and efficient cutting work on a narrow area, in a hydraulic chuck configured such that a pressurization fluid pressurized by a push member (8b) is fed through a pressurization passage (8) to a pressurization chamber (6) to reduce a diameter of an elastic deformable part (2b), the hydraulic chuck includes a body (1) having a flange accommodating part (5a) opening at a small-diameter portion at a tip end of the body and a sleeve accommodating part (5b) opening in a bottom face of the flange accommodating part (5a), and a sleeve (2) having a hole (2a) in which a gripped object is inserted, the sleeve being engageable and insertable with/to the sleeve accommodating part (5b) from a leading end side of the flange accommodating part (5a), the sleeve (2) forming the pressurization chamber (6) reserving therein an amount of the pressurization fluid between this sleeve (2) and the sleeve accommodating part (5b), the sleeve (2) having a flange (7) engageable with the flange accommodating part (5a).

1 Claim, 11 Drawing Sheets

(56) References Cited

U.S. PATENT DOCUMENTS

| | | | |
|---|---|---|---|
| 7,364,390 B2* | 4/2008 | Krenzer | B23B 51/02 |
| | | | 408/227 |
| 8,764,354 B2* | 7/2014 | Schuffenhauer | B23B 31/1107 |
| | | | 408/231 |
| 2007/0252344 A1 | 11/2007 | Retzbach | |
| 2011/0318130 A1 | 12/2011 | Freyermuth et al. | |
| 2013/0001896 A1* | 1/2013 | Herud | B23B 31/005 |
| | | | 279/4.07 |
| 2013/0292913 A1* | 11/2013 | Teusch | B23B 31/1178 |
| | | | 279/2.06 |
| 2014/0353931 A1* | 12/2014 | Frota de Souza Filho | B23B 31/204 |
| | | | 279/4.07 |
| 2015/0283627 A1* | 10/2015 | Borapura | B23B 31/305 |
| | | | 279/20 |

FOREIGN PATENT DOCUMENTS

| | | | | |
|---|---|---|---|---|
| CN | 1878631 | A | 12/2006 | |
| CN | 102310333 | A | 1/2012 | |
| CN | 103025458 | A | 4/2013 | |
| DE | 102008039197 | A1 | 2/2010 | |
| DE | 202011004231 | U1 * | 8/2011 | B23B 31/201 |
| DE | 202012104969 | U1 * | 2/2013 | B23B 31/02 |
| EP | 1090704 | A1 | 4/2001 | |
| EP | 2177296 | A1 | 4/2010 | |
| JP | S61-71337 | U | 5/1986 | |
| JP | S61-90843 | A | 5/1986 | |
| JP | H6-63207 | U | 9/1994 | |
| JP | H10-29106 | A | 2/1998 | |
| JP | 2003-522650 | A | 7/2003 | |
| SU | 217888 | A1 | 5/1968 | |
| SU | 347125 | A1 | 8/1972 | |
| SU | 1073008 | A1 | 2/1984 | |

OTHER PUBLICATIONS

Notification of Transmittal of Translation of the International Preliminary Report on Patentability for PCT/JP2013/060832 mailed Oct 22, 2015, which encloses International Preliminary Report on Patentability and Written opinion of the International Searching Authority.

Office Action of corresponding Chinese patent application No. 201380075538.2 mailed Sep. 5, 2016.

Office Action mailed Jan. 30, 2017 in corresponding RU Application 2015147863/02(073692), and English translation thereof, 11 pages.

Extended European Search Report mailed Oct. 28, 2016 in corresponding EP Application No. 13881528.7, 9 pages.

* cited by examiner

HYDRAULIC CHUCK

TECHNICAL FIELD

This disclosure relates to a hydraulic chuck configured such that a pressurization fluid pressurized by a push member is fed through a pressurization passage to a pressurization chamber to reduce a diameter of an elastic deformable part.

BACKGROUND ART

When a cutting work is to be effected on a narrow area located at a deep back side of an object to be worked, it is necessary to employ a tool chuck having a small outer diameter. Conventionally, as such chuck, a so-called hydraulic chuck designed to grip a cutting tool with use of a hydraulic pressure is employed. With this type of chuck, there is available only limited space for disposing required mechanisms such as a pressurization chamber and the gripping mechanism as a whole is formed compact. Accordingly, a cutting work at an area which is formed progressively narrower toward the back side can be carried out with ease. However, there is a need to feed an amount of coolant to the cutting portion, so a coolant feeding mechanism of various types would be employed, in addition to the chuck mechanism.

In the case of a hydraulic chuck disclosed in Patent Document 1, a pressurization chamber is formed between a sleeve which directly grips an inserted cutting tool and a body holding this sleeve. Then, with pressurization of a work oil reserved therein, an elastic deformable part formed at a portion of the sleeve is deformed to be reduced diametrically, thus gripping the cutting tool.

This hydraulic chuck has no arrangement for feeding coolant such as cutting oil agent to the cutting tool. Thus, for carrying out a cutting work on an object, coolant needs to be fed to the cutting tool with using a coolant feeding unit provided separately of the hydraulic chuck.

Further, in a hydraulic chuck disclosed in Patent Document 2, to a tip part of a body gripping a cutting tool, there is fixed a cover disc having a hole portion in which a shank portion projecting from the body of the cutting tool is to be inserted. This cover disc is not for gripping the cutting tool. Rather, in an inner circumferential face of the hole portion, there is formed a groove portion which extends along a longitudinal direction of the shank portion. This groove portion and the shank portion projecting from the body of the cutting tool together form a gap, through which coolant is discharged.

BACKGROUND ART DOCUMENTS

Patent Documents

Patent Document 1: Japanese Unexamined Patent Application Publication No. 61-90843
Patent Document 2: Japanese Unexamined Utility Model Application Publication No. 6-63207

SUMMARY OF DISCLOSURE

Object to be Solved

In the case of the hydraulic chuck disclosed in Patent Document 1, with use of the coolant feeding unit provided separately of the hydraulic chuck, coolant is fed to a cutting tool gripped by the hydraulic chuck.

When the cutting tool needs to be brought closer to the working object, it is necessary to avoid interference between a coolant feeding passage and the working object. For this reason, a cutting work on an area located at a deep back side of the working object would be difficult. Moreover, on each occasion of mounting the hydraulic chuck, a discharging direction of coolant needs to be set, so a cutting work was very troublesome.

On the other hand, in the case of the hydraulic chuck disclosed in Patent Document 2, the projecting length of the cutting tool from its body required for working an object set to a predetermined position is long by an amount corresponding to the thickness of the cover disc not gripping the cutting tool. Further, the document is silent about the configuration of its pressurization chamber (hydraulic chamber). For this reason, there would occur significant vibration of the cutting tool during working, which would impair cutting accuracy.

When a cutting work is to be carried out on an area located at a narrow deep part of a working object, it is desirable that the body holding the sleeve be formed narrow.

When the body is to be formed narrow, this results in radial wall thinning of the body and the sleeve. Accordingly, the contact area between the body and the sleeve is reduced also. For this reason, in case these members are to be brazed to each other for instance, the bonding strength therebetween tends to be insufficient. However, in that case too, it will still be needed to provide a predetermined gripping force for gripping the cutting tool.

The present invention has been made in view of the above-described state of the art and its object is to provide a hydraulic chuck which allows accurate and efficient cutting work on a narrow area.

Solution

For accomplishing the above-noted object, according to a characterizing feature of a hydraulic chuck proposed by the present invention, in a hydraulic chuck configured such that a pressurization fluid pressurized by a push member is fed through a pressurization passage to a pressurization chamber to reduce a diameter of an elastic deformable part, the hydraulic chuck comprises:

a body having a flange accommodating part opening at a small-diameter portion at a tip end of the body and a sleeve accommodating part opening with a smaller diameter than the flange accommodating part in a bottom face of the flange accommodating part; and a sleeve having a hole in which a gripped object is inserted, the sleeve being engageable and insertable with/to the sleeve accommodating part from a leading end side of the flange accommodating part, the sleeve forming the pressurization chamber reserving therein an amount of the pressurization fluid between this sleeve and the sleeve accommodating part, the sleeve having a flange engageable with the flange accommodating part.

With the above-described arrangement, as a flange engageable with a flange accommodating part which is open at a small-diameter portion at a tip end of the body is formed in the sleeve, the contact area of the sleeve for its contact with the body is increased, thereby increasing an area available for brazing between the body and the sleeve, so that the fixing strength of the sleeve is increased advantageously. With this, there has been obtained a hydraulic chuck which is capable of providing a high gripping force despite the tip end having only a small diameter and allowing accurate and efficient cutting work on a narrow area.

According to a further characterizing feature of the invention, the hydraulic chuck further comprises a coolant feeding passage which extends through the inside of the body, the coolant feeding passage being communicated with a coolant discharging opening provided at the tip end of the body, at least a portion of a circumferential edge of the coolant discharging opening being formed either along an arc defining a maximum outer diameter of the flange or on a more radially inner side than the arc.

With the above-described arrangement, it becomes possible to dispose the coolant discharging opening with an offset toward the center of the hydraulic chuck. With this, it becomes possible to restrict radial enlargement of the hydraulic chuck, thus avoiding interference between the hydraulic chuck and the working object even for a narrow cutting area.

According to a still further characterizing feature of the present invention, at least a portion of an outer edge of the flange has a reduced outer diameter, and the coolant discharging opening is open on a radially outer side of the small-diameter portion of the flange and away from the outer edge of the flange.

With the above-described arrangement, the entire portion of the circumferential edge of the coolant discharging opening is free from interference with the flange, and at the same time, at least a partial area of the coolant discharging opening can be formed on the inner side of the arc which defines the maximum outer diameter of the flange. Therefore, coolant being discharged from the coolant discharging opening will not be interfered by the flange, so that the coolant can be discharged in a predetermined direction in a reliable manner.

According to a still further characterizing feature of the present invention, a space is provided between a bottom face of the flange accommodating part and the flange; the pressurization chamber is in communication with the space; and the pressurization passage is opened in the bottom face.

With the above-described arrangement, the pressurization fluid of the pressurization passage is caused to flow out of the bottom face of the flange accommodating part, thereby to pressurize pressurization fluid present inside the pressurization chamber through the space formed between the bottom face and the flange. In this way, although the pressurization fluid is caused to flow via the tip end side of the hydraulic chuck, the above-described arrangement facilitates formation of the pressurization mechanism for reducing the diameter of the elastic deformable part.

That is, in the case of the above-described arrangement wherein the pressurization passage is communicated with the space formed between the bottom face of the flange accommodating part and the flange, the pressurization mechanism can be provided only by forming at least one pressurization passage inside the body. The space communicated with this pressurization passage and formed between the bottom face of the flange accommodating part and the flange and the pressurization chamber can be readily formed by inserting the sleeve into the body, provided the shape of the flange accommodating part and the shape of the flange are set appropriately in advance.

As described above, with the above arrangement, there is no need to provide a pressurization passage from the outer circumference of the body, so it becomes extremely easy to form a pressurization passage which has a favorable outer appearance and which is free from leakage, and the pressurization mechanism can be configured in a reasonable manner.

EMBODIMENTS

Next, embodiments of a hydraulic chuck relating to the invention will be described with reference to the accompanying drawings.

Embodiment 1

FIGS. 1 through 7 show Embodiment 1 of a hydraulic chuck relating to the invention.

A hydraulic chuck A is configured such that pressurization fluid pressurized by an operation plug 8*b* as a "push member" is caused to flow through a pressurization passage 8 to be fed into a pressurization chamber 6, thereby to reduce a diameter of an elastic deformable part 2b for gripping a gripped shank B1 of a gripping object B.

More particularly, the hydraulic chuck A includes a metal body 1 having a tapered shape to be mounted to a machine such as a working machine, the body 1 forming a sleeve receiving portion 5 provided as a cylindrical space provided along a direction of axis X. The chuck A further includes a sleeve 2 accommodated into the sleeve receiving portion 5 from its leading end side coaxially. This sleeve 2 includes a shank inserting portion 2a to which the gripped shank B1 of the gripping object B such as a cutting tool is inserted, with the shank inserting portion 2a being provided coaxially with the axis X. Between the sleeve 2 and the body 1, there is formed the pressurization chamber 6 which stores an amount of pressurization fluid such as oil. Further, the hydraulic chuck A includes a pressurization mechanism configured to feed the pressurization fluid to the pressurization chamber 6 for realizing diameter reduction of the elastic deformable part 2b provided in the sleeve 2. The pressurization mechanism includes a pressurization passage 8 extending from the pressurization chamber 6 toward a base end portion and an operational plug 8b provided in the body 1 continuously from an end portion of the pressurization passage 8 to pressurize the pressurization fluid. Incidentally, the sleeve 2 can be inserted to the sleeve receiving portion 5 from the leading end side thereof and includes a flange 7 which comes into contact with the tip end of the body 1, and this flange 7 and the body 1 are brazed to each other.

The body 1 is provided in the form of a rotary body rotatable about the axis X. And, as a sleeve receiving portion 5 opening at a small-diameter portion at the tip of the body 1, the body 1 includes a flange accommodating part 5a and a sleeve accommodating part 5b opening with a smaller diameter than the flange accommodating part 5a in the bottom face of this flange accommodating part 5a, with the parts 5a, 5b being coaxial.

The sleeve 2 is engaged and inserted from the tip end of the body 1 to the inside (sleeve receiving portion 5) of this body 1. As bonding faces of these are brazed to each other such as sliver brazing, the sleeve 2 and the body 1 are integrated with each other.

The sleeve 2 grips therein the gripped shank B1 of the cutting tool B. The body 1 includes a coolant discharging portion 3 for discharging coolant against the cutting tool B gripped by the hydraulic chuck A for cooling this tool B. The tip end of the coolant discharging portion 3 is formed as a coolant discharging opening 3a opening at the tip end face of the body 1.

The body 1 includes a chuck body 1a defining an outer circumferential groove 4 to be gripped by a manipulator, a chuck cylinder 1b formed integrally with the tip end side of the chuck body 1a, a shank 1c formed integrally with the rear end of the chuck body 1a to be engaged with a spindle of the working machine, and the sleeve receiving portion 5 forming a circular space coaxial with the axis X for accommodating the sleeve 2. The chuck cylinder 1b is provided in the form of a truncated cone whose diameter progressively decreases away from the chuck body 1a.

Figure 4:
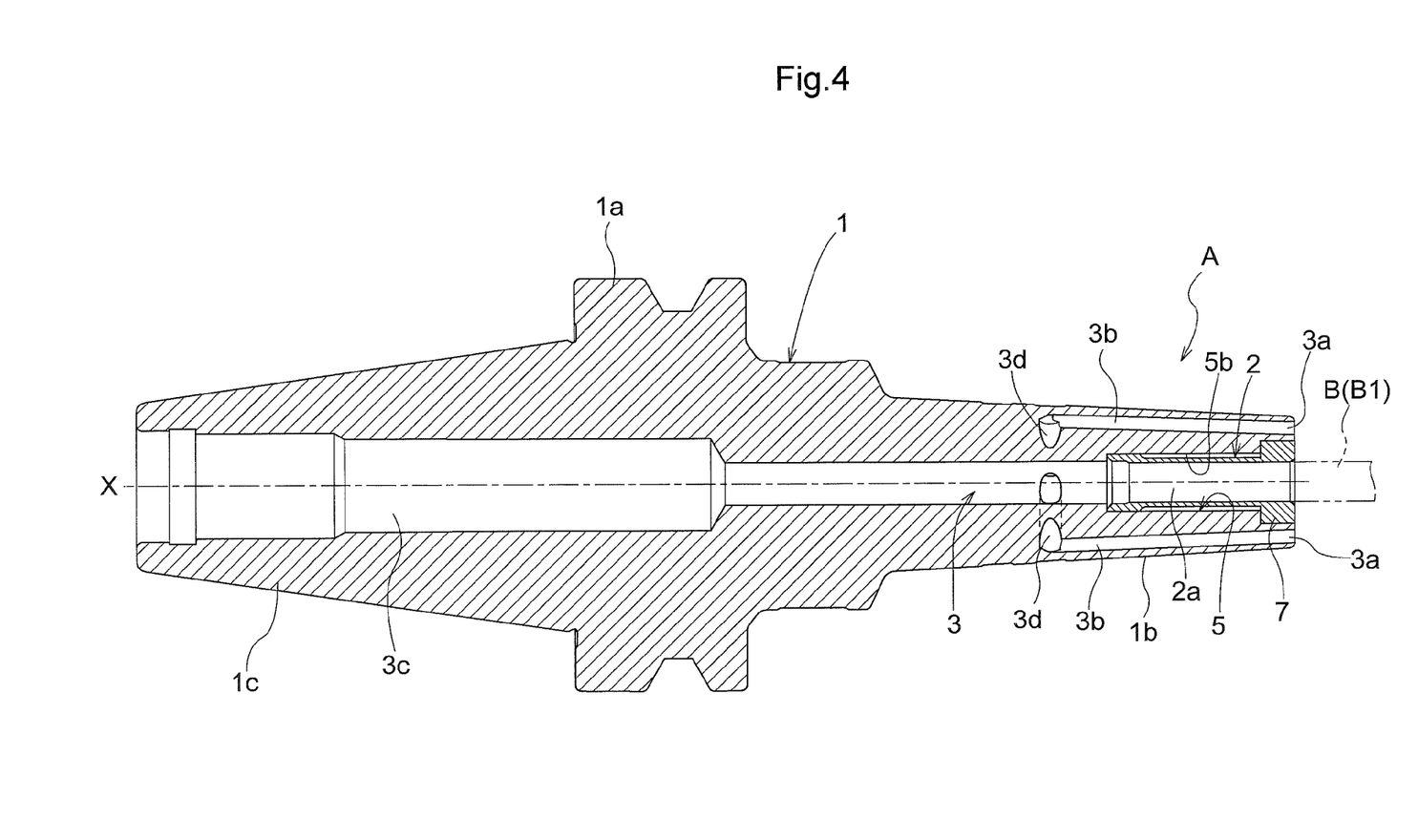
FIG. 4 is a section view taken along an axial direction of the hydraulic chuck relating to Embodiment 1.
Figure 5:
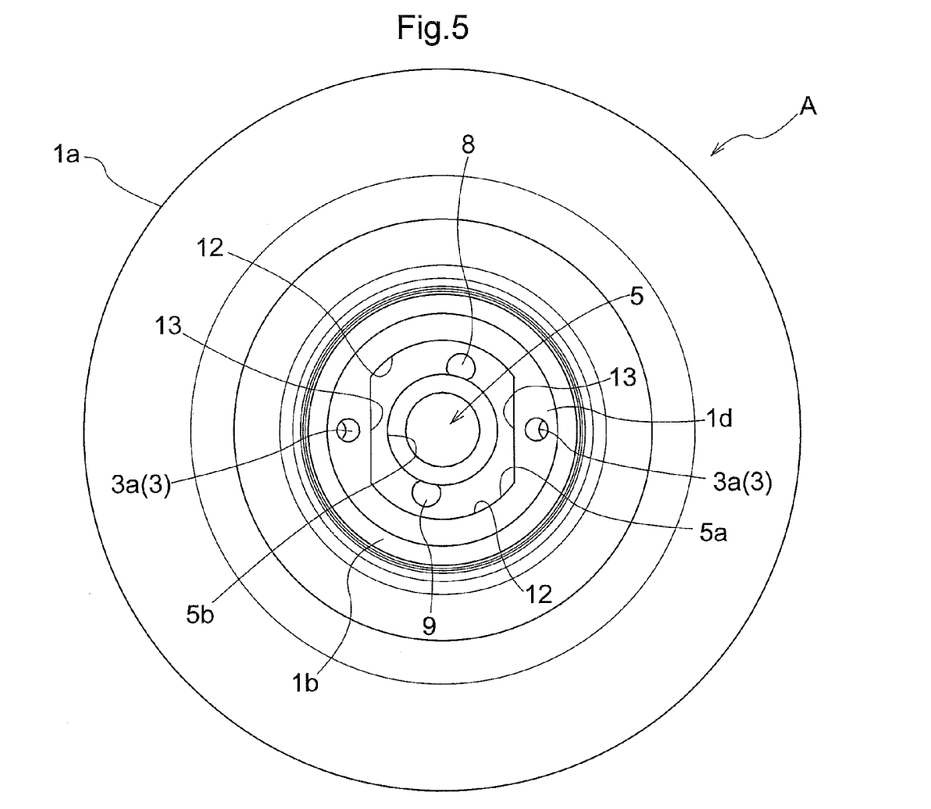
FIG. 5 is a front view showing a body tip portion with a sleeve being removed therefrom, relating to Embodiment 1.
Figure 6:
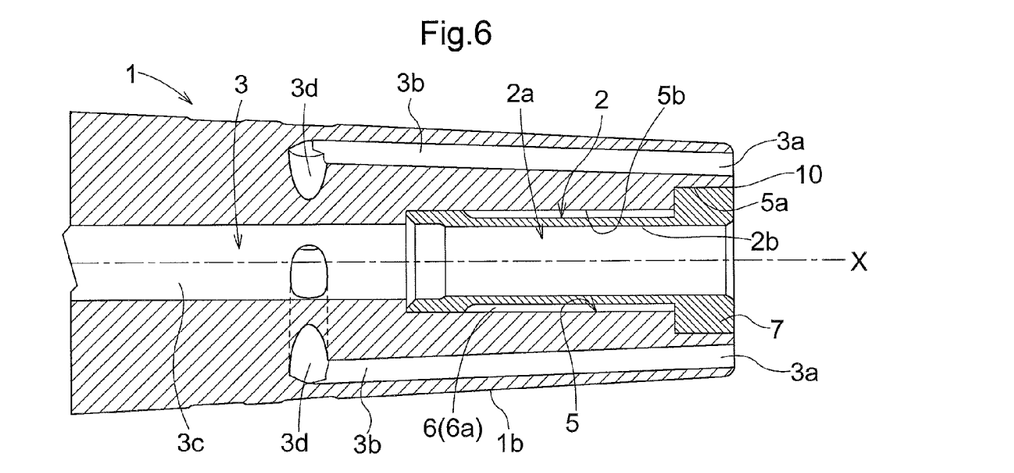
FIG. 6 is a section view for explaining a coolant discharging portion, relating to Embodiment 1.

The coolant discharging portion 3, as shown in FIGS. 4 through 6, includes a coolant feeding passage 3c which extends through the inside of the body 1, and this coolant feeding passage 3c is communicated with the coolant discharging opening 3a provided at the tip end of the body 1. More particularly, in the tip end face 1d of the body (chuck cylinder 1b) 1, there are provided a plurality of coolant discharging openings 3a as circular openings. In the instant embodiment, there are provided two coolant discharging openings 3a. Each coolant discharging opening 3a includes a plurality of coolant discharging passages 3b opening at the tip end of the body and having e.g. a circular cross section. In this embodiment, there are provided two such coolant discharging passages 3b. On the other hand, on the base end side of the body 1, there is provided one coolant feed passage 3c opening coaxially with the axis of the body and having a circular cross section. These parts, i.e. the coolant discharging passages 3b and the coolant feeding passage 3c are communicated via a coolant communicating passage 3d provided along the radial direction of the body and having a circular cross section. Advantageously, the multiple coolant discharging openings 3a, the coolant discharging passages 3b and the coolant communicating passage 3d will be disposed equidistantly along the circumferential direction of the body. With this arrangement, it is possible to maintain favorable rotational balance and to allow coolant to be discharged uniformly around the cutting tool also.

With the above-described provision of the coolant discharging openings 3a in the tip end face of the body 1, that is, in the tip end face of the hydraulic chuck A, there is no need to provide a coolant discharging device, separately of the hydraulic chuck A. Therefore, when a cutting work is effected on a narrow deep area of the working object, this cutting work will be facilitated.

Further, as the coolant discharging openings 3a are provided in the tip end face of the body 1, by e.g. setting the opening directions of the coolant discharging openings 3a appropriately, coolant can be fed to the cutting portion reliably. And, with the possibility of reliable setting of the discharging directions of coolant, the feeding efficiency of coolant can be enhanced, through e.g. reduction of the discharge amount of coolant.

With provision of one coolant feeding passage 3c coaxial with the body 1 on the base end side of the body 1 and at least one coolant discharging passage 3b communicated with this coolant feeding passage 3c on the tip end side of the body 1, a feeding circuit for coolant can be configured in a rational manner. The coolant feeding passage 3c provided at the center configures a coolant feeding circuit with the simplest arrangement relative to the body 1. In this coolant feeding passage 3c on the side of the tip end of the body 1, the cutting tool B will be inserted and gripped, so that the coolant feeding passage 3c will be sealed by the cutting tool B. Therefore, the coolant communicating passage which communicates the coolant feeding passage 3c with the coolant discharging passage 3b is provided on the tip end side of the body 1, relative to the base end portion of the cutting tool B gripped in the sleeve 2. The coolant discharging passage 3b may be formed appropriately around the cutting tool B so as to be able to feed coolant in an efficient manner, according to the size, the wall thickness of the body 1.

The coolant feeding passage 3c is formed by a tubular space whose diameter is reduced stepwise toward the chuck cylinder 1b. When the shank 1c is engaged with the spindle of the working machine, the coolant feeding passage 3c will be connected to a coolant feeding section included in the working machine. The chuck cylinder 1b side of the coolant feeding passage 3c is communicated with the sleeve receiving portion 5. Incidentally, the coolant feeding passage 3c need not be communicated with the sleeve receiving portion 5.

The two coolant discharging openings 3a are arranged at positions point-symmetric relative to the axis X. Each one of the coolant communicating passages 3d is formed by drilling a cutting hole having a circular cross section extending obliquely off the axis X from the outer circumference side of the chuck cylinder 1b relative to the coolant feeding passage 3c, such that the cutting hole may be communicated with an end of each coolant discharging passage 3b.

The two coolant communicating passages 3d are formed in point-symmetry relative to the axis X. An opening portion of each coolant communicating passage 3d which is opened in the outer circumferential face of the chuck cylinder 1b is closed liquid-tightly by an unillustrated plug.

The sleeve receiving portion 5 includes the annular flange accommodating part 5a forming the opening at the tip end of the body 1 and the sleeve accommodating part 5b having a circular cross section and communicated coaxially with the inside of the flange accommodating part 5a, with these parts 5a, 5b being formed continuously with each other.

Figure 7:
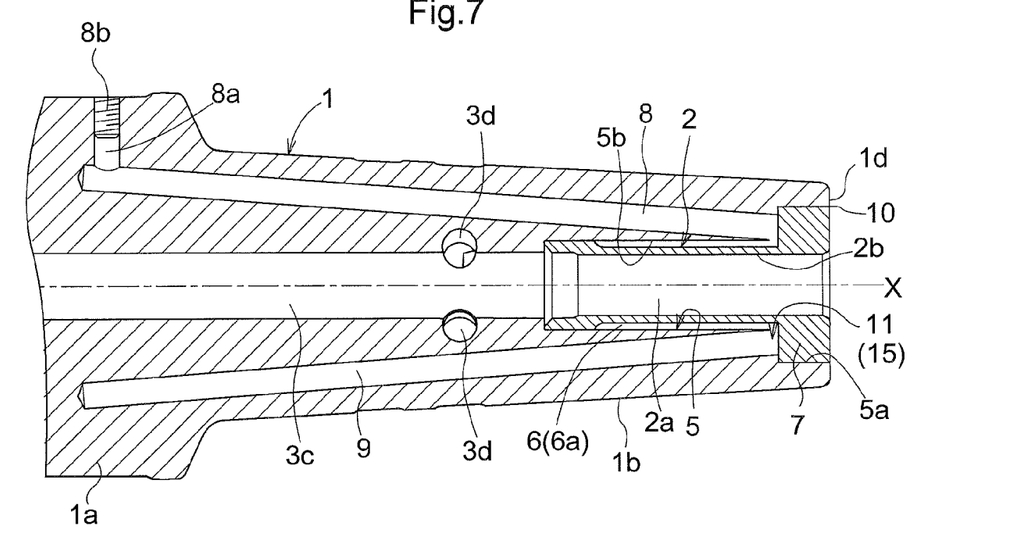
FIG. 7 is a section view for explaining a pressurization arrangement of a pressurization chamber, relating to Embodiment 1.

Between the sleeve 2 and the body 1, there is formed the annular pressurization chamber 6. The sleeve 2, as shown in FIG. 6 and FIG. 7, includes the shank inserting hole 2a having a circular cross section to which the gripped shank B1 of the cutting tool B is inserted, and the annular thin-walled elastic deformable part 2b which can be reduced in its diameter to press the gripped shank B1 inserted into the shank inserting hole 2a for gripping this shank B1 in association with pressurization of the pressurization chamber 6.

The sleeve 2 includes the shank inserting hole 2a coaxially with the sleeve accommodating part 5b. As the sleeve 2 is inserted and engaged with the sleeve accommodating part 5b from the tip end side of the flange accommodating part 5a, the pressurization chamber 6 is formed between this sleeve 2 and the sleeve accommodating part 5b.

Referring to the elastic deformable part 2b, a wide circumferential groove 6a forming the pressurization chamber 6 is provided on the outer circumference side of the sleeve 2, and a groove bottom portion of this wide circumferential groove 6a forms the elastic deformable part 2b.

At the tip end portion of the sleeve 2, there is integrally formed the flange 7 whose diameter progressively increases along the sleeve radius direction, and this flange 7 is engaged in the flange accommodating part 5a. Therefore, as the sleeve 2 is inserted and accommodated from the flange accommodating part 5a to the sleeve accommodating part 5b until the flange 7 comes into contact with the bottom face of the flange accommodating part 5a, the single pressurization chamber 6 is formed between the outer circumferential face of the sleeve 2 and the inner circumferential face of the sleeve accommodating part 5b.

That is, the flange accommodating part 5a engaged with the flange 7 is formed at the tip end portion of the body 1 and the tip end face of the sleeve 2 and the tip end face of the body 1 may be continuous with each other along the direction of the axis X.

With the above-described arrangement of the flange accommodating pat 5a, it is possible to increase the contact area between the body 1 and the sleeve 2. For instance, the back face of the flange 7 can be contacted with the bottom face of the flange accommodating part 5a, and the lateral face of the flange 7 can be contacted with the inner wall face of the flange accommodating part 5a. As these parts or portions are brazed to each other, the bonding strength between the body 1 and the sleeve 2 can be increased.

Further, by inserting and accommodating the sleeve 2 from the opening on the tip end side of the body 1 with the flange 7 being engaged with the flange accommodating part 5a, the pressurization chamber 6 between the outer circumferential face of the sleeve 2 and the inner circumferential face of the body 1 as well as the pressurization passage 11 communicating between the pressurization passage 8 and the pressurization chamber 6 can be formed readily.

As shown in FIG. 5 and FIG. 7, the pair of pressurization passages 8, 9 for pressurizing the pressurization chamber 6 are provided in symmetry in the body 1 to be opened in the bottom face of the flange accommodating part 5a. One pressurization passage 8 is communicated with an operational passage 8a formed by drilling a hole in the chuck body 1a from its outer circumferential face side in the radial direction, and within this operational passage 8a, the operational plug 8b is threaded in liquid-tight manner. The other pressurization passage 9 is provided as "a dummy" with consideration to rotational balance of the body 1, and this passage 9 is not directly communicated with the operational passage 8a.

A space 15 formed between the bottom face of the flange accommodating part 5a and the back face of the flange 7 constitutes the pressurization passage 11 communicating the respective pressurization passages 8, 9 with the pressurization chamber 6. Accordingly, the pressurization chamber 6 is communicated with the space between the bottom face of the flange accommodating part 5a and the back face of the flange 7.

The sleeve 2 accommodated in the sleeve accommodating part 5b is brazed with use of e.g. silver braze, thus being fixed integrally to the body 1 in liquid-tight manner. Pressurization fluid such as oil is filled in liquid-tight manner in and between the operational passage 8a, the respective pressurization passages 8, 9, the pressurization communicating passage 11 and the pressurization chamber 6.

In operation, by threading-in the operational plug 8b such as a hexagonal wrench to the operational passage 8a, the volume of this operational passage 8a will be reduced. As a result, the pressurization fluid will be pressurized to deform the elastic deformable part 2b for reducing its diameter, so that the gripped shank B1 inserted into the shank inserting hole 2a may be pressed thus being gripped.

A boundary 10 between the body 1 and the sleeve 2 is provided in the tip end face 2d of the body 1. With this, the area in the sleeve 2 used for gripping the cutting tool B is extended to the tip end of the sleeve 2, whereby the cutting tool B is gripped with use of the large area extending to the leading end portion of the body 1. Thus, the gripping force for gripping the cutting tool B is increased, so that a high-precision cutting work is made possible with effective restriction of vibration of the the cutting tool B.

Figure 1:
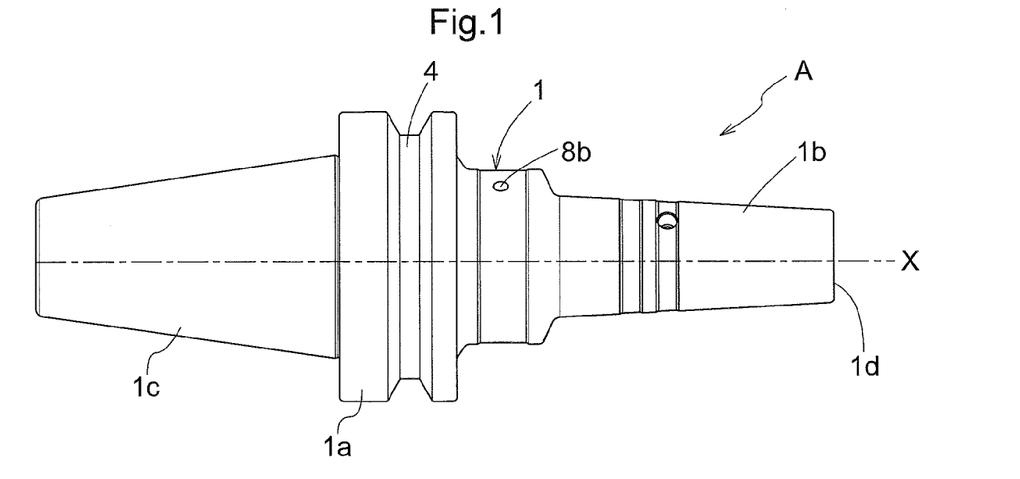
FIG. 1 is a side view showing a hydraulic chuck relating to Embodiment 1.
Figure 2:
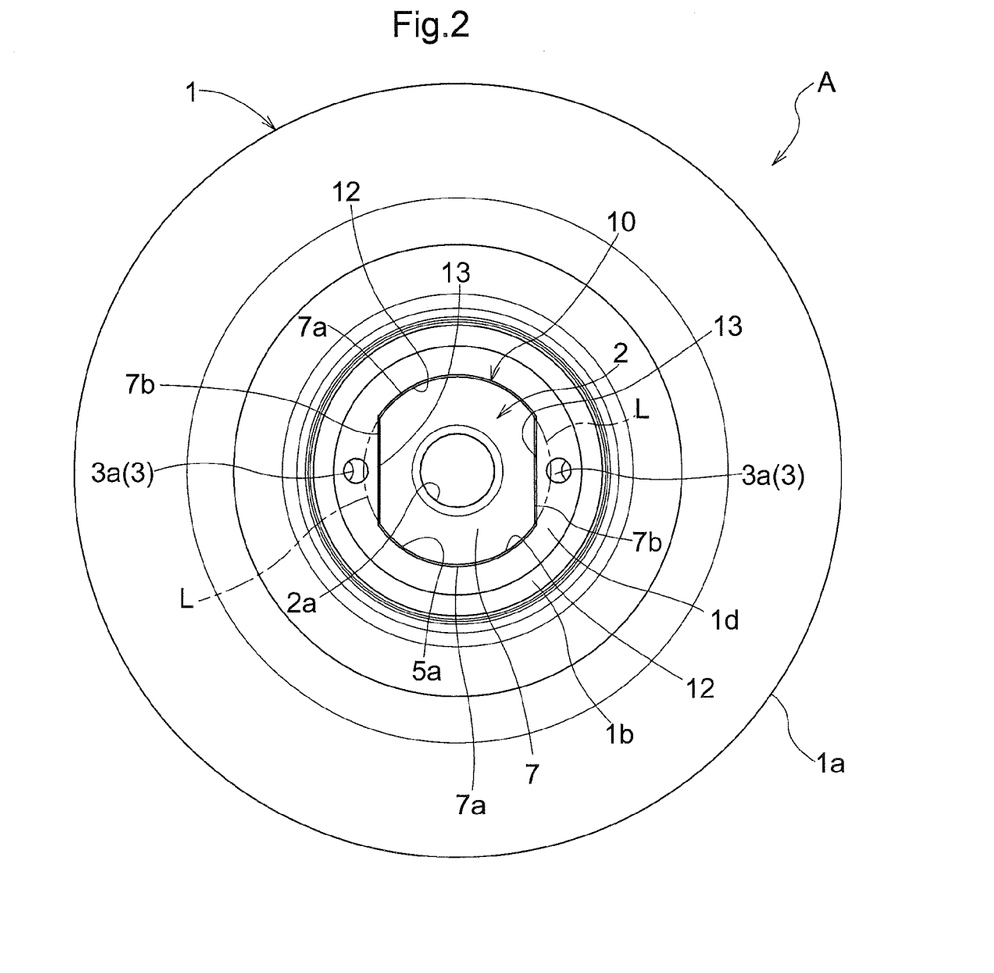
FIG. 2 is a front view showing the hydraulic chuck relating to Embodiment 1.
Figure 3:
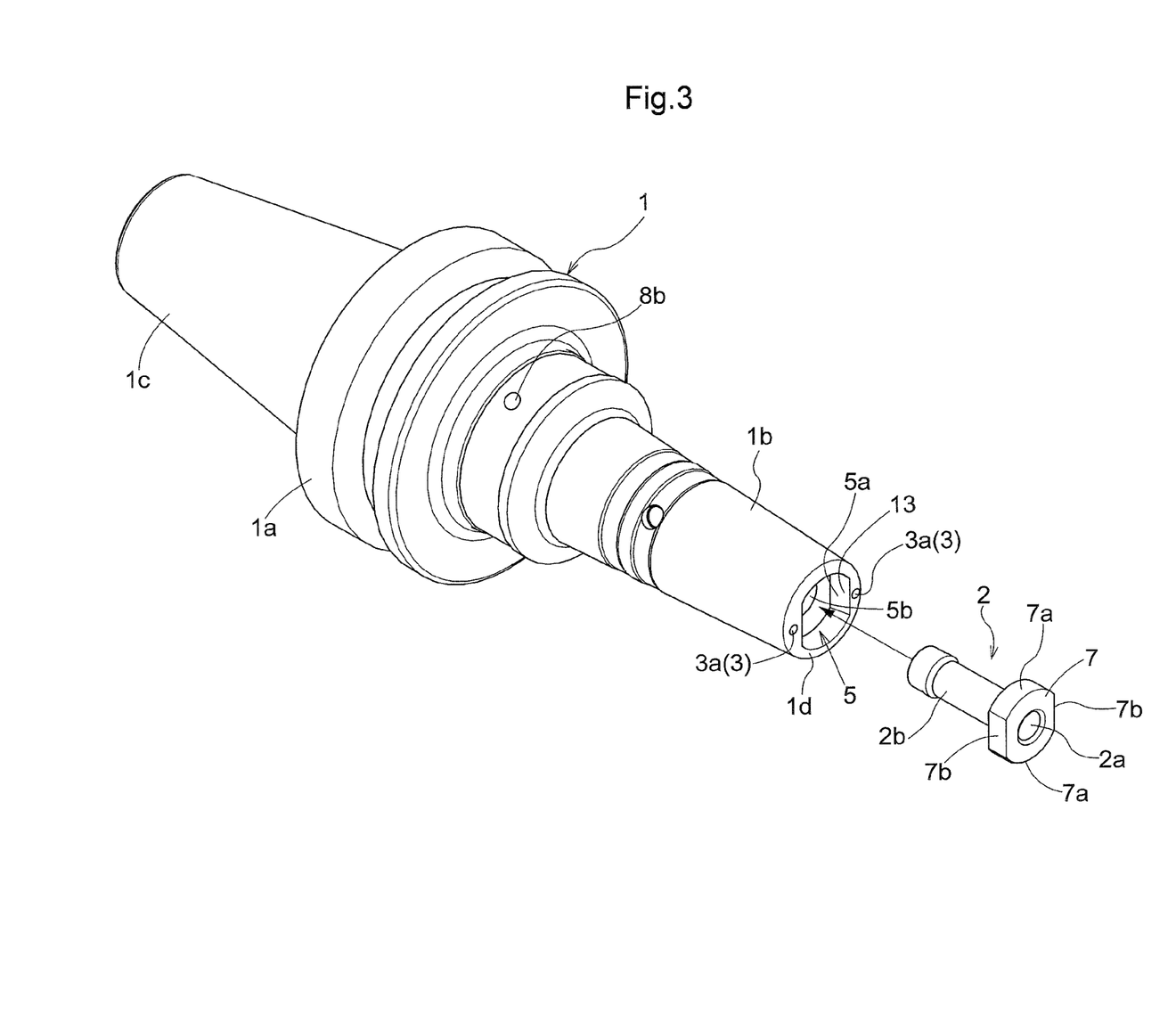
FIG. 3 is an exploded perspective view showing the hydraulic chuck relating to Embodiment 1.

As shown in FIG. 2, at least a portion of the circular circumferential edge of the coolant discharging opening 3a is formed on the more inner side in the body radius direction than an arc L which defines the maximum outer diameter of the flange 7.

More particularly, as shown in FIG. 2, the outer circumferential shape of the flange 7 is configured of a pair of arcuate outer circumferential portions 7a centering about the axis X and a pair of flat outer circumferential portions 7b parallel with each other which are disposed in point-symmetry relative to the axis X as the point of symmetry, so that the flange 7 has an irregular radial shape having different radiuses in the flange circumferential direction. Therefore, the arc L which defines the maximum outer diameter of the flange 7 means an arcuate segment which is drawn about the axis X by the radius of the arcuate outer circumferential portions 7a.

At least a portion of the outer edge of the flange 7 is formed smaller in its outer diameter than the remaining portion thereof. And, the coolant discharging opening 3a is opened on the radially outer side of this small-diameter portion of the flange 7 away from the outer edge of the flange 7.

The flange accommodating part 5a, as shown in FIG. 2 and FIG. 5, is formed of a pair of arcuate inner circumferential face portions 12 engaged with the respective arcuate outer circumferential face portions 7a and a pair of flat face portions 13 engaged with the respective flat outer circumferential face portions 7b.

Embodiment 2

Figure 8:
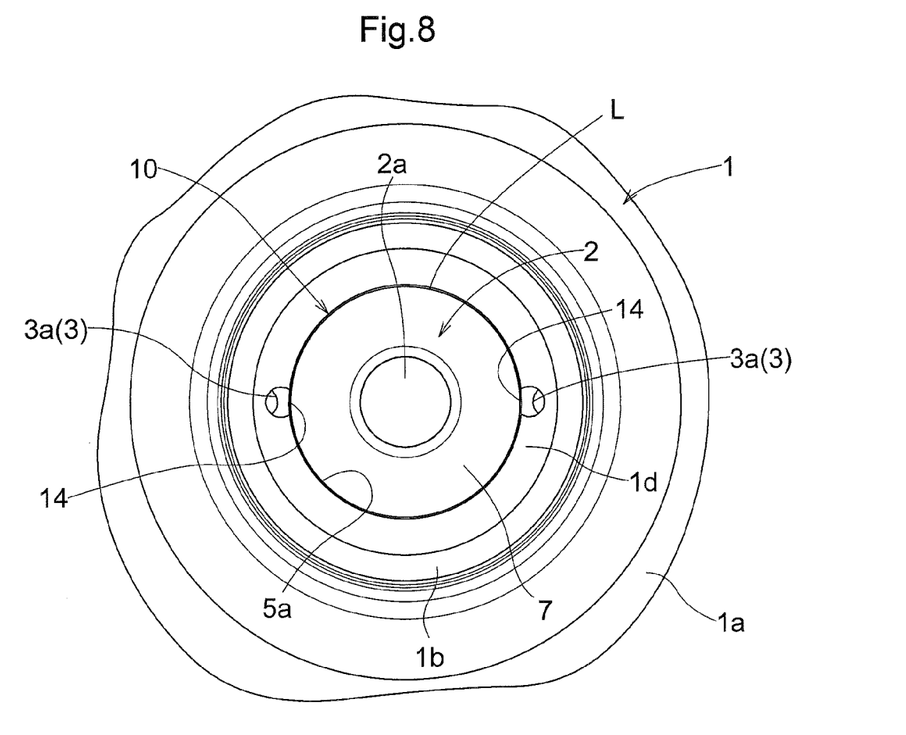
FIG. 8 is a front view showing a hydraulic chuck relating to Embodiment 2.

FIG. 8 shows a hydraulic chuck A according to Embodiment 2.

In this embodiment, at least a portion of the circumferential edge of the coolant discharging opening 3a is formed on the inner side of the body radius relative to the arc L defining the maximum outer diameter of the flange 7.

According to this embodiment, the diameter of the outer circumference of the coolant discharging opening can be reduced. Therefore, it becomes possible to simplify the shapes of the flange 7 and the flange accommodating part 5a while achieving diameter reduction at the tip end portion of the body 1. The rest of the arrangement is identical to that of Embodiment 1.

Embodiment 3

Figure 9:
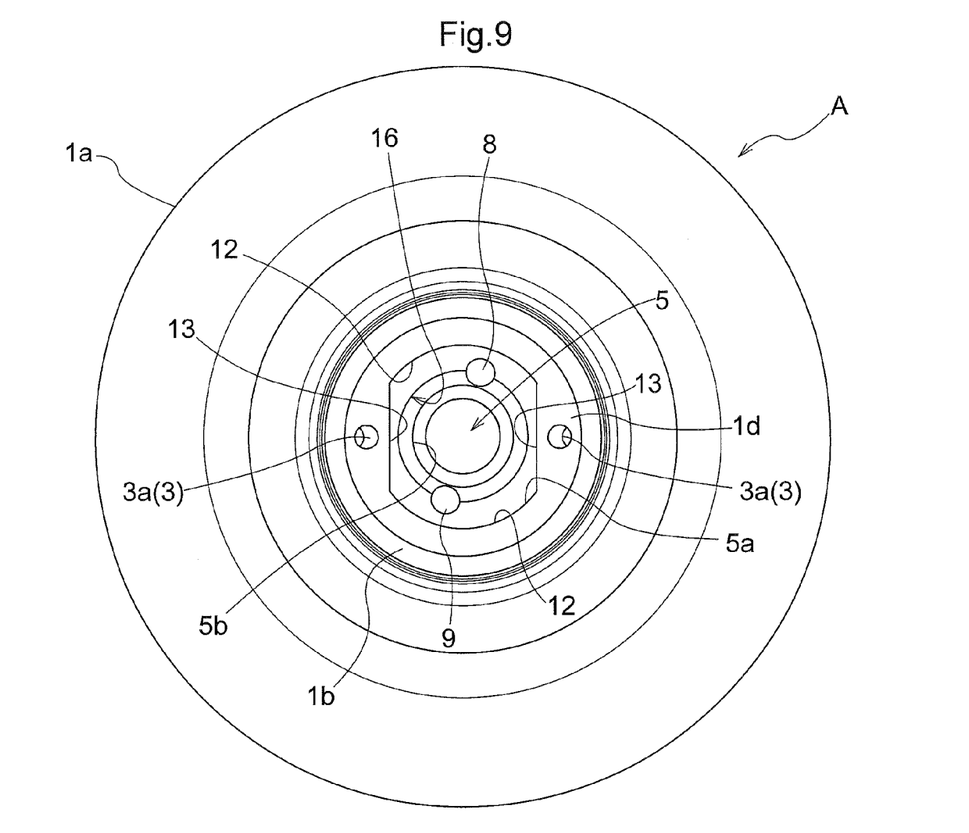
FIG. 9 is a front view showing a body tip portion with a sleeve being removed therefrom, relating to Embodiment 3.
Figure 10:
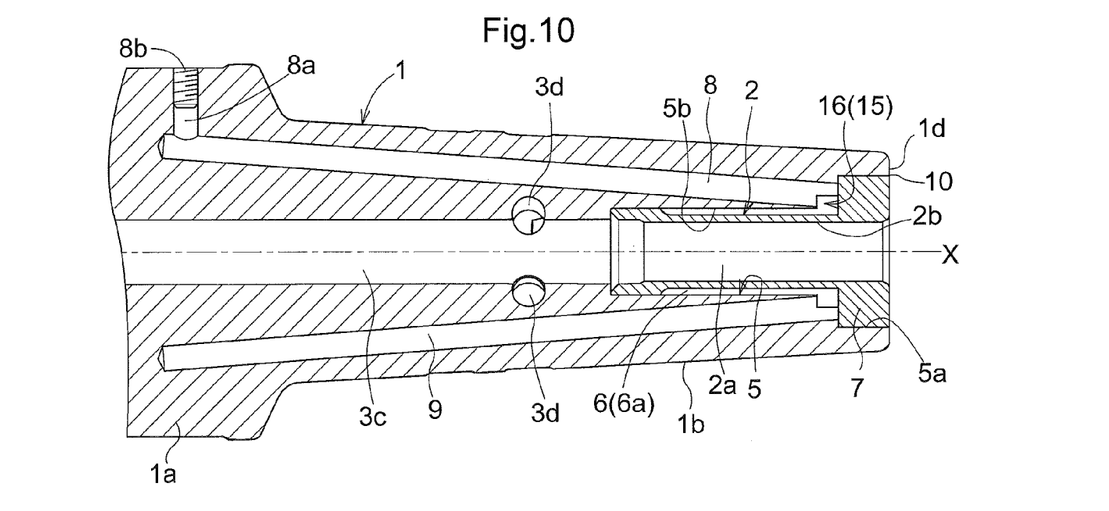
FIG. 10 is a section view for explaining a pressurization arrangement of a pressurization chamber, relating to Embodiment 3.
Figure 11:
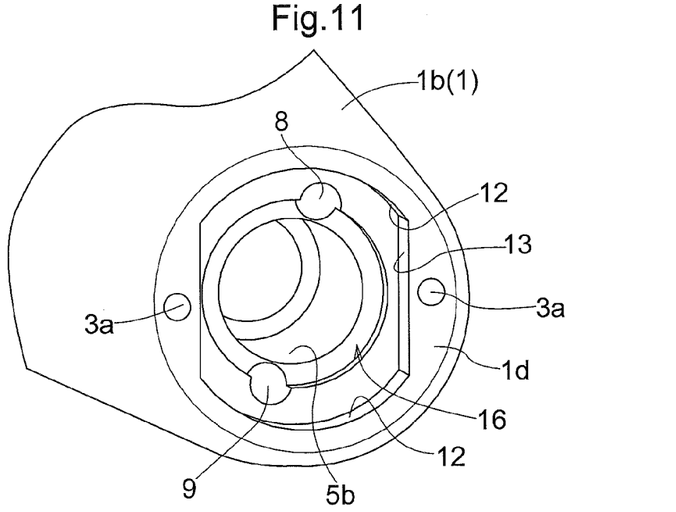
FIG. 11 is a perspective view showing a body tip portion with a sleeve being removed therefrom, relating to Embodiment 3.

FIGS. 9 through 11 show a hydraulic chuck A according to Embodiment 3.

In this embodiment, the space 15 forming the pressurization passage 11 to which the pressurization passages 8, 9 are opened, is formed of one continuous circular ring-like stepped portion 16 formed in the bottom face of the flange accommodating part 5a and having a greater diameter than the inner diameter of the sleeve accommodating part 5b.

The rest of the arrangement is identical to that of Embodiment 1.

Embodiment 4

Figure 12:
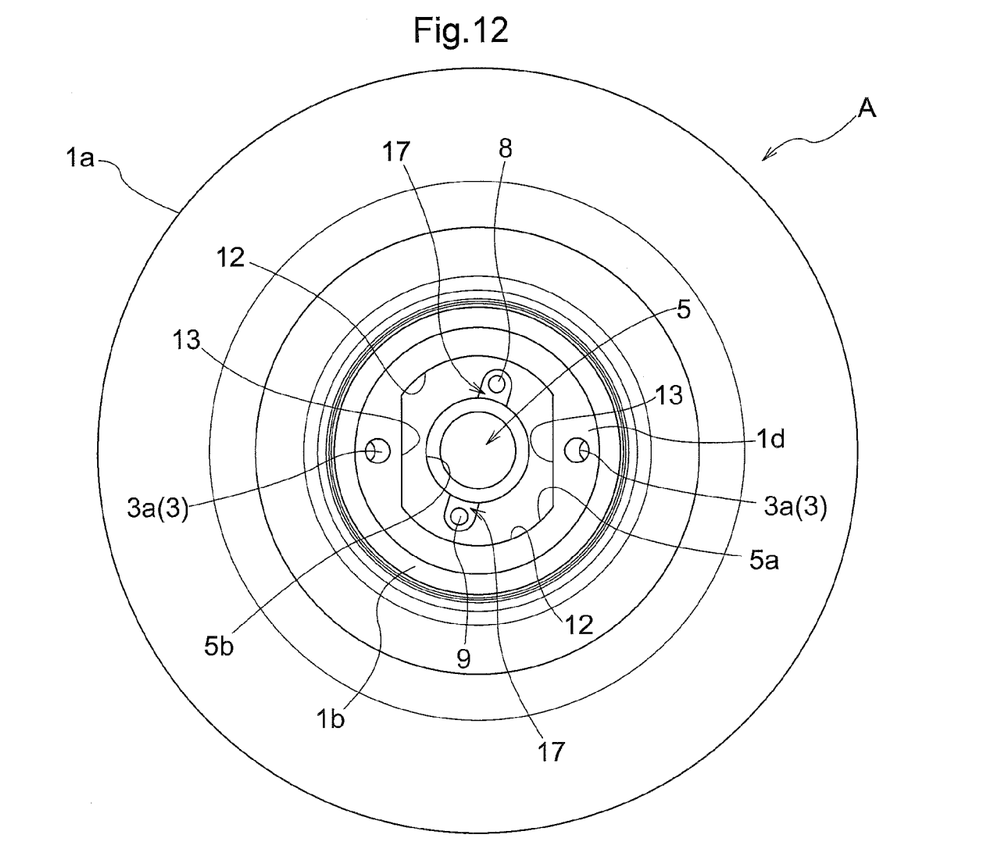
FIG. 12 is a front view showing a body tip portion with a sleeve being removed therefrom, relating to Embodiment 4.
Figure 13:
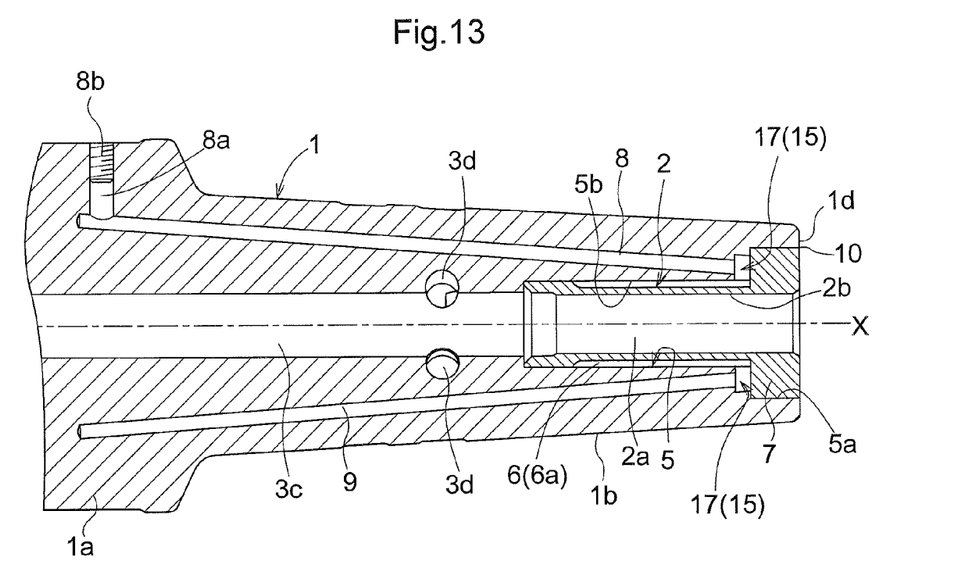
FIG. 13 is a section view for explaining a pressurization arrangement of a pressurization chamber, relating to Embodiment 4.
Figure 14:
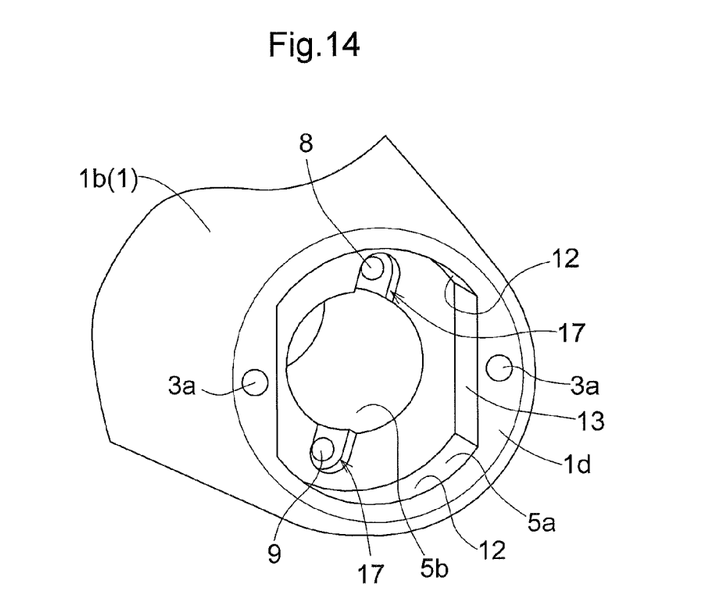
FIG. 14 is a perspective view showing the body tip portion with the sleeve being removed therefrom, relating to Embodiment 4.

FIGS. 12 through 14 show a hydraulic chuck A according to Embodiment 4.

In this embodiment, the pressurization passage 11 to which the pressurization passages 8, 9 are opened, is formed of a recessed portion 17 provided in the bottom face of the flange accommodating part 5a and provided respectively for the pressurization passages 8, 9 connected to the sleeve accommodating part 5b.

The rest of the arrangement is identical to that of Embodiment 1.

Embodiment 5

Figure 15:
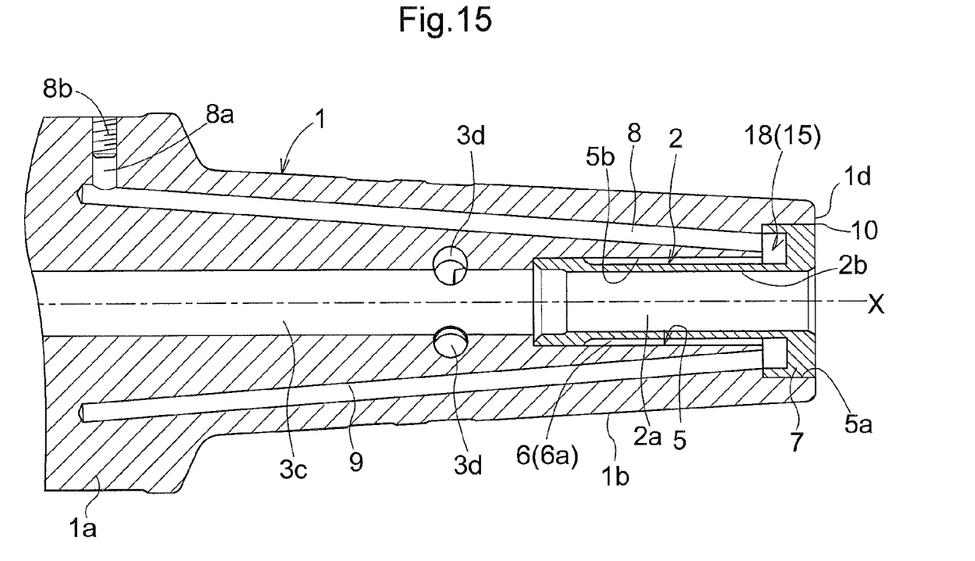
FIG. 15 is a section view for explaining a pressurization arrangement of a pressurization chamber, relating to Embodiment 5.
Figure 16:
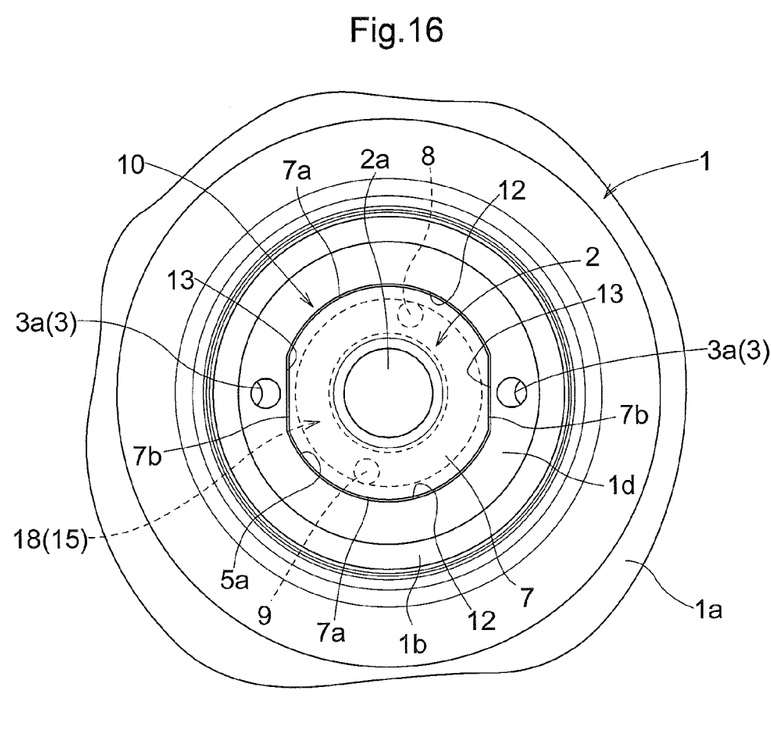
FIG. 16 is a front view showing a hydraulic chuck relating to Embodiment 5.
Figure 17:
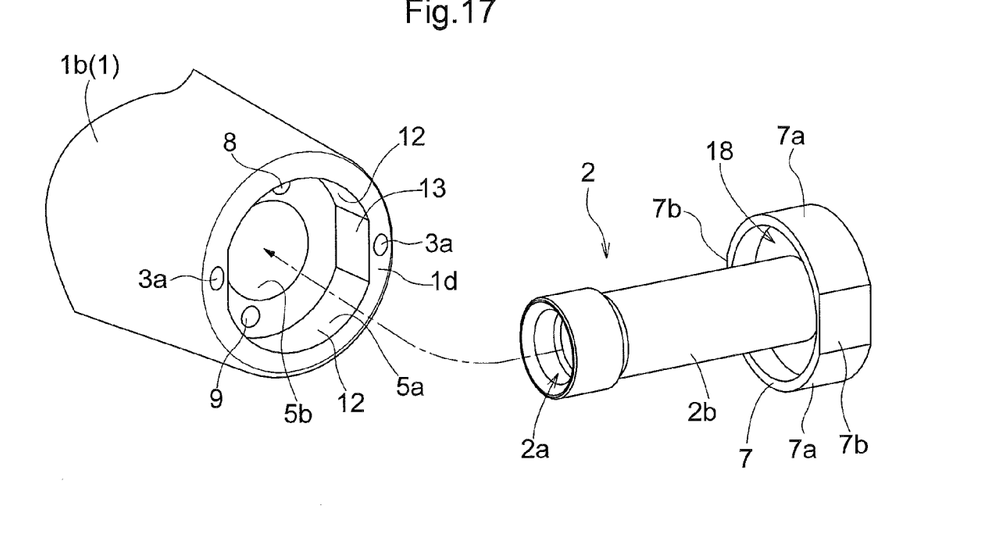
FIG. 17 is an exploded perspective view showing the hydraulic chuck relating to Embodiment 5.

FIGS. 15 through 17 show a hydraulic chuck A according to Embodiment 5.

In this embodiment, the space 15 forming the pressurization passage 11 is formed of one continuous circular ring-like groove portion 18 provided in the flange 7 at a deep end face side of the flange accommodating part 5a and at a portion along the outer circumferential face of the elastic deformable part 2b into which the pressurization passages 8, 9 are opened.

The rest of the arrangement is identical to that of Embodiment 1.

Embodiment 6

Figure 18:
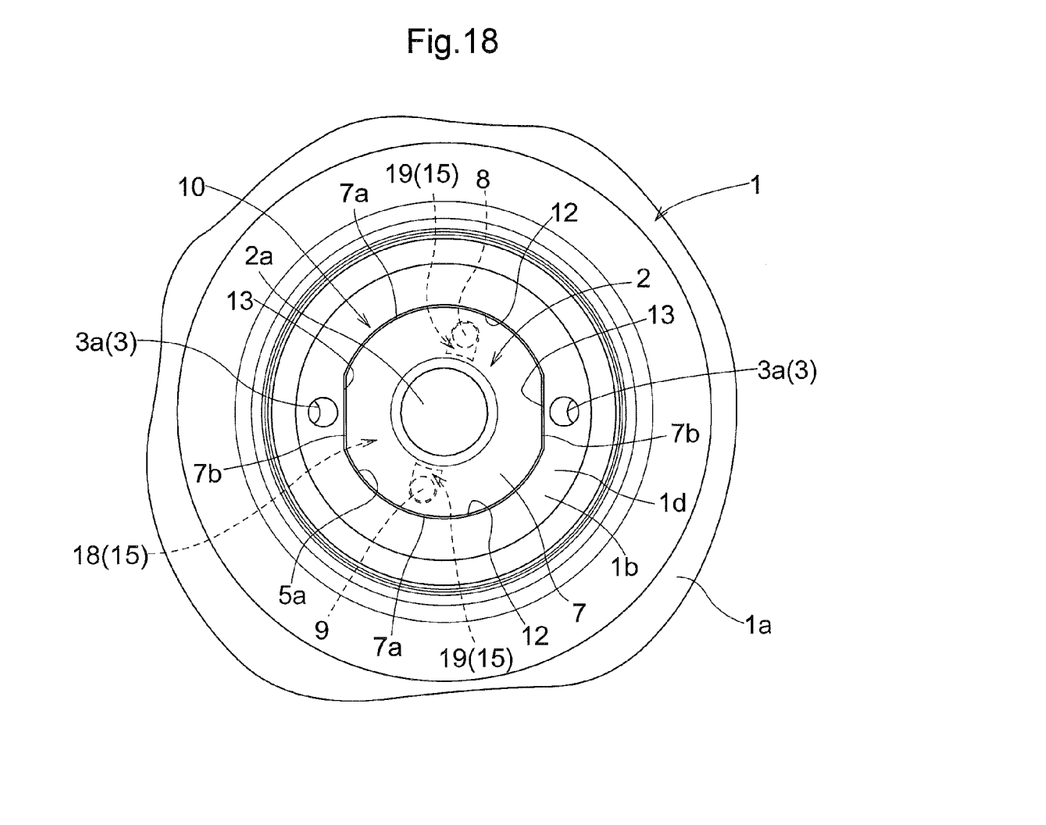
FIG. 18 is a front view showing a hydraulic chuck relating to Embodiment 6.
Figure 19:
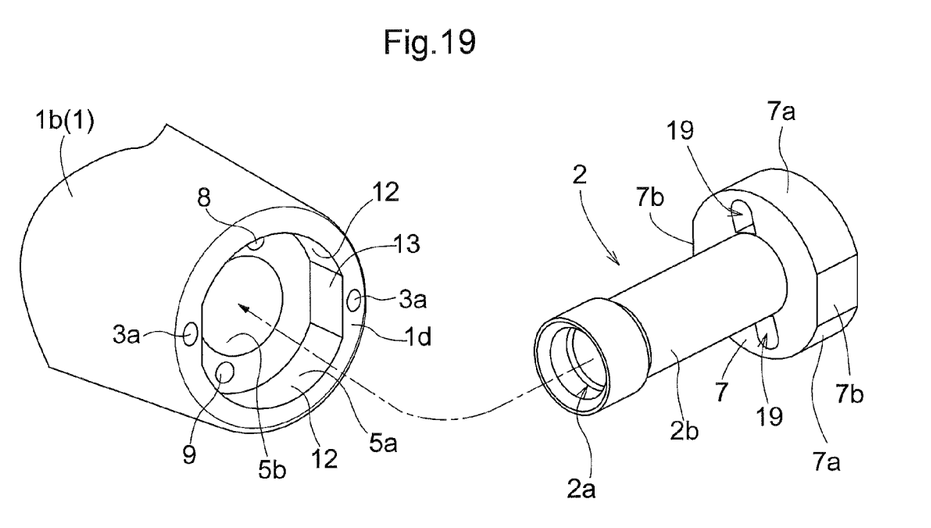
FIG. 19 is an exploded perspective view showing the hydraulic chuck relating to Embodiment 6.

FIG. 18 and FIG. 19 show a hydraulic chuck A according to Embodiment 6.

In this embodiment, the space 15 forming the pressurization passage 11 is formed of a recessed portion 19 provided at a deep tip end face side of the flange accommodating part 5a of the flange 7 and at a portion along the outer circumferential face of the elastic deformable part 2b, communicated respectively with the pressurization passages 8, 9.

The rest of the arrangement is identical to that of Embodiment 1.

INDUSTRIAL APPLICABILITY

The present invention is applicable to a variety of hydraulic chucks usable for attaching a cutting tool to a working machine.

DESCRIPTION OF REFERENCE MARKS/NUMERALS 1 body
2 sleeve
2a hole
2b elastic deformable part
3a coolant discharging opening
3c coolant feeding passage
5 sleeve receiving portion
5a flange accommodating part
5b sleeve accommodating part
6 pressurization chamber
7 flange
8 pressurization passage
8b push member
15 space
B gripped object (object to be gripped)
L arc defining maximum outer diameter of flange

The invention claimed is:

1. A hydraulic chuck configured such that a pressurization fluid pressurized by a push member is fed through a pressurization passage to a pressurization chamber to reduce a diameter of an elastic deformable part, the hydraulic chuck comprising:

a body having a flange accommodating part opening at a reduced-diameter portion at a tip end of the body and a sleeve accommodating part opening with a smaller diameter than the flange accommodating part in a bottom face of the flange accommodating part;

a sleeve having a hole in which a gripped object is inserted, the sleeve being engageable and insertable with/to the sleeve accommodating part from a leading end side of the flange accommodating part, the sleeve forming the pressurization chamber reserving therein an amount of the pressurization fluid between this sleeve and the sleeve accommodating part, the sleeve having a flange engageable with the flange accommodating part;

wherein the hydraulic chuck further comprises a coolant feeding passage which extends through the inside of the body, the coolant feeding passage being communicated with a coolant discharging opening provided at the tip end of the body;

at least a portion of a circumferential edge of the coolant discharging opening is formed on a more radially inner side than an arc defining a maximum outer diameter of the flange;

at least a portion of an outer edge of the flange has a small-diameter portion which is formed smaller in its outer diameter than the remaining portion of the flange; and the coolant discharging opening is open on a radially outer side of the small-diameter portion of the flange and away from the outer edge of the flange.

* * * * *